Aug. 30, 1966   H. E. SMITH   3,269,509
EASILY REMOVABLE AND ADJUSTABLE CODE SELECTOR LINKAGE MEANS
Filed Oct. 30, 1964   6 Sheets-Sheet 1
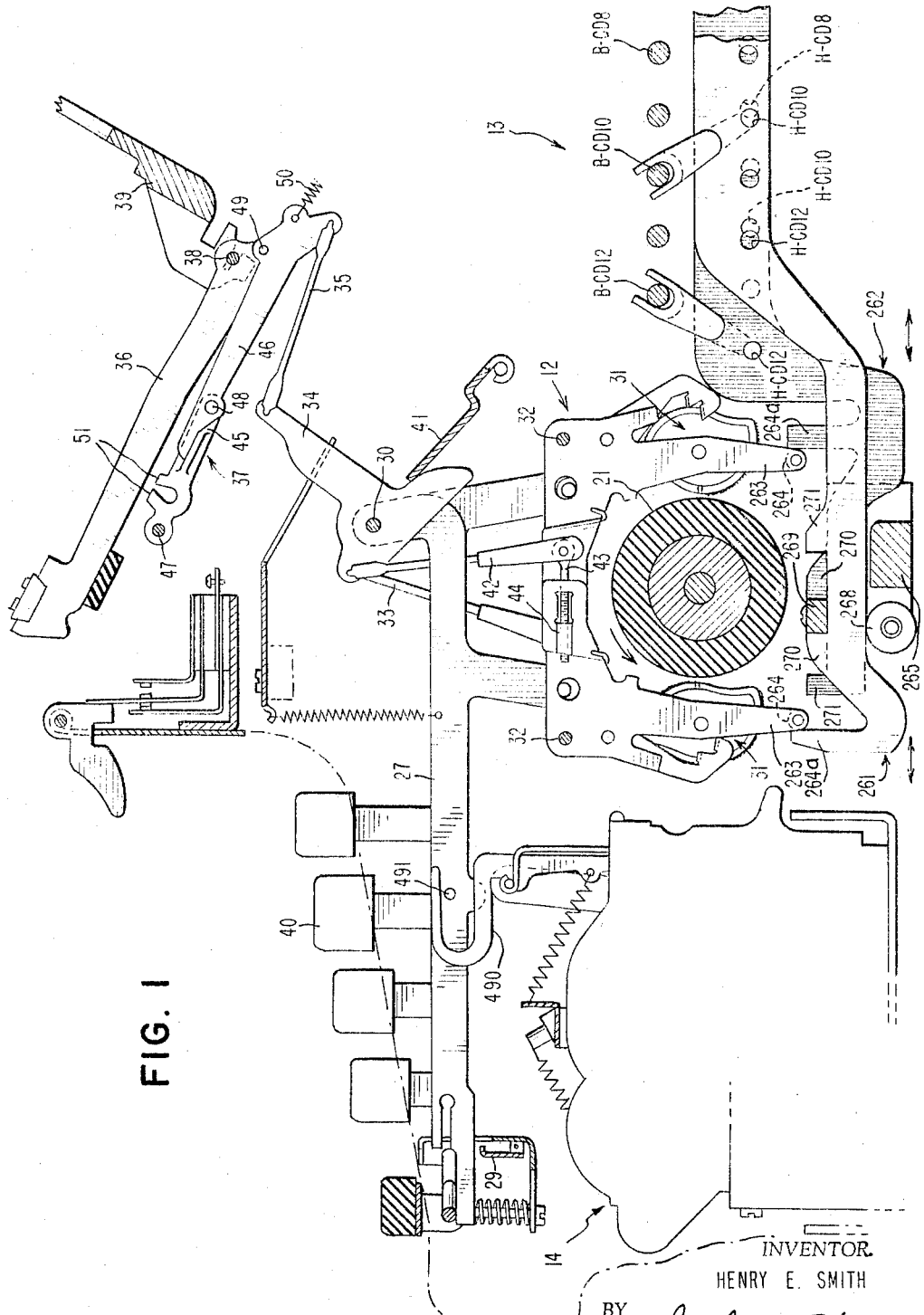
FIG. 1
INVENTOR.
HENRY E. SMITH
BY 
ATTORNEY

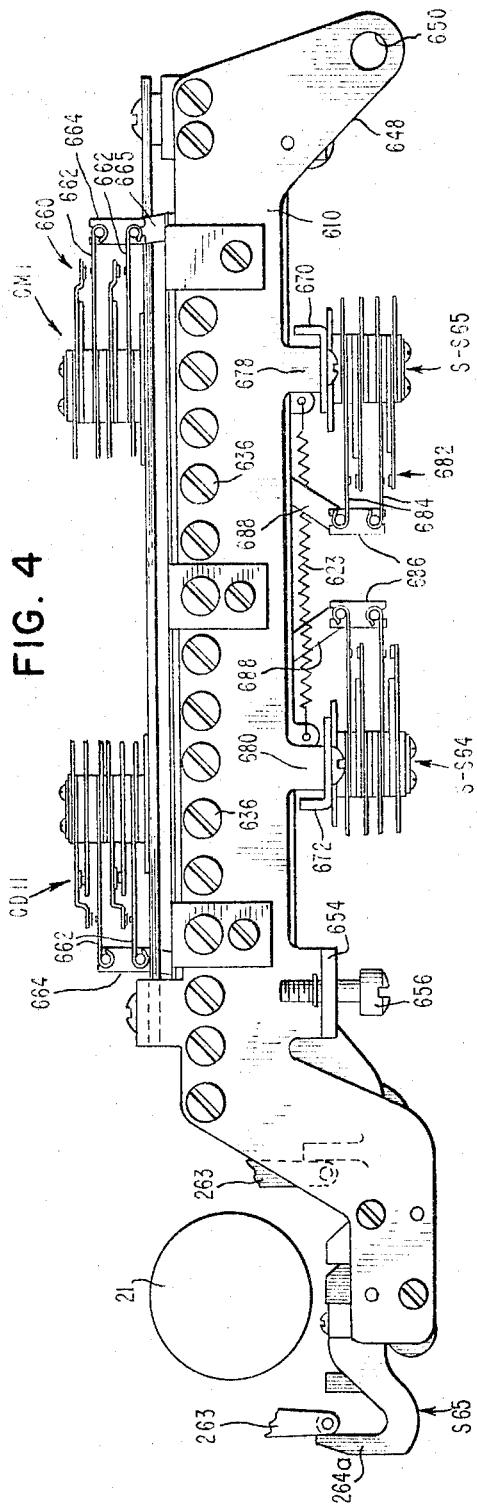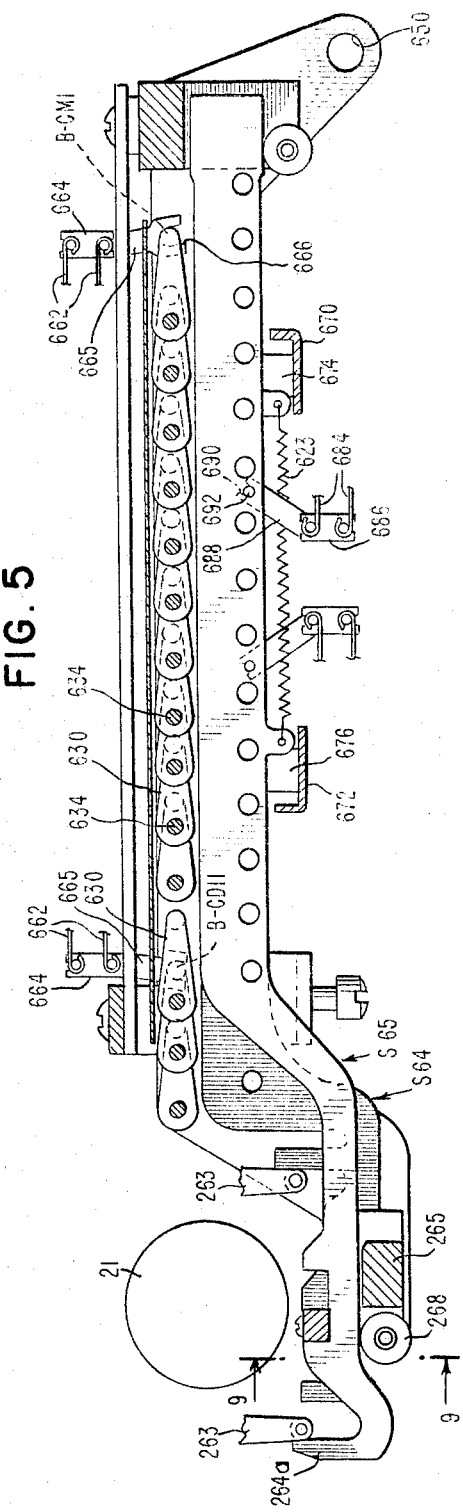

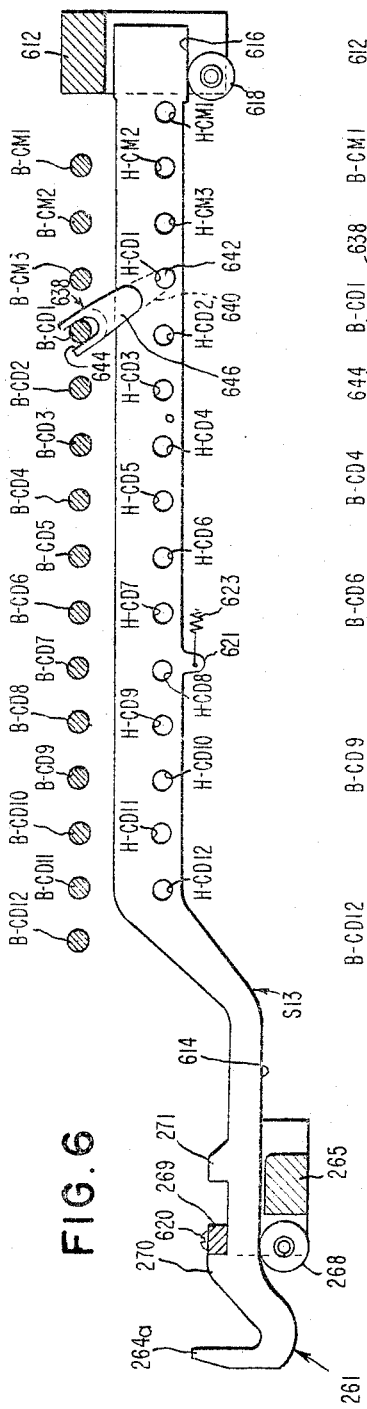
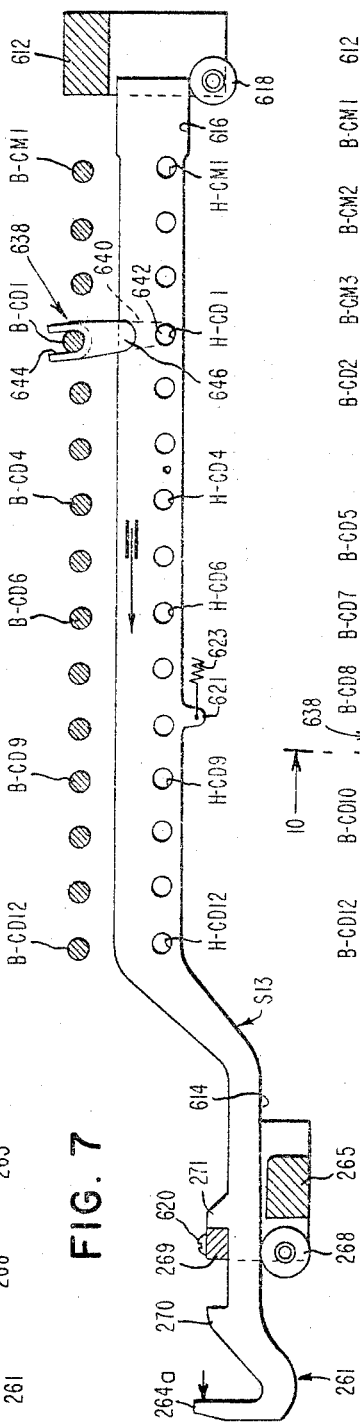
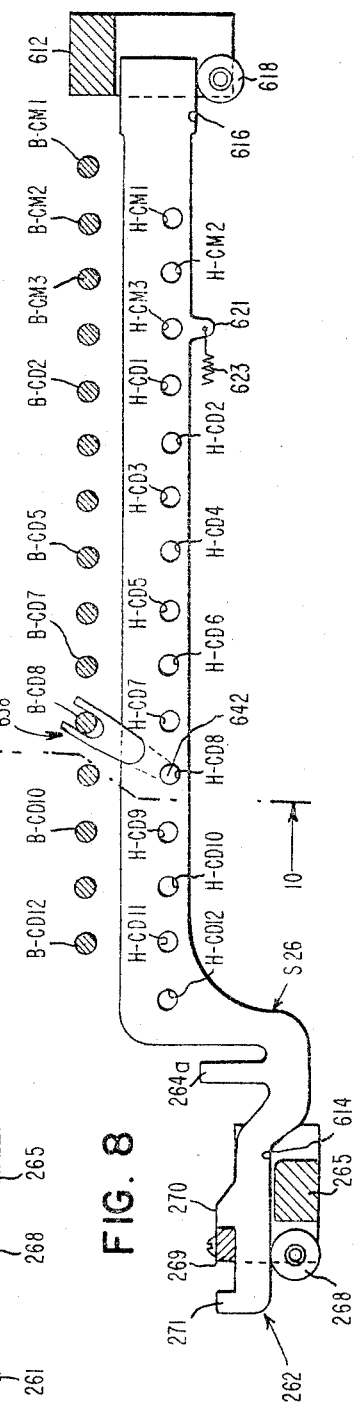

Aug. 30, 1966  H. E. SMITH  3,269,509
EASILY REMOVABLE AND ADJUSTABLE CODE SELECTOR LINKAGE MEANS
Filed Oct. 30, 1964  6 Sheets-Sheet 6

United States Patent Office 3,269,509
Patented August 30, 1966

3,269,509
EASILY REMOVABLE AND ADJUSTABLE CODE SELECTOR LINKAGE MEANS
Henry E. Smith, Brockport, N.Y., assignor to Friden Inc., a corporation of Delaware
Filed Oct. 30, 1964, Ser. No. 407,752
12 Claims. (Cl. 197—19)

This invention relates to code selectors and, more particularly, to a code selector for a writing machine in which all written and format control information is placed in coded form by operation of the selector.

The invention has particular application to writing machines which not only prepare a written record in readily recognizable form, e.g., one employing arabic characters and numerals, but which also provide both the written information and information concerning its format in coded form, e.g., in binary notation. Such machines include a code selector which receives information in one form and produces as an output the information in coded form in accordance with a predetermined coding system. The coded information is typically generated as electrical signals which can be used to operate a tape punch mechanism, for example, to produce a punch-code record of the coded information. Such signals may also be used to operate local or remote writing machines which receive and decode the coded information to reproduce it in written form usually having the same format as the original copy.

Typically, in such writing machines, the code selector is not easily susceptible to change of the information coding which it provides in operation, so that once a particular code has been established by its construction, a complete disassembly of the selector and its re-assembly with new code selector elements is necessary to change the code. U.S. Patent No. 2,700,446 granted to E. O. Blodgett on January 25, 1955 is typical of such writing machines and their associated code selector structures. The latter incorporates a plurality of movable code-selector slides each having cam surfaces which selectively engage movable bails connected to switches that are part of the electrical circuitry for generating output signals representative of the coded information. Each of the slides is coupled to a different key of the typewriter for movement when the associated key is actuated. Depending upon the number and locations of the cam surfaces of a slide which in turn depend upon the code employed, a particular group of bails is actuated when one of the typewriter keys is depressed to move the corresponding slide. Each slide actuates one or more predetermined bails in accordance with the code employed. To change the code, i.e., to change the bail or bails actuated by each slide, it is necessary to change the numbers and locations of the cam surfaces on each of the slides. This cannot be done without completely removing the slides from the code selector and replacing them with new slides having cam surfaces at different locations corresponding to the new code.

Accordingly, it is an object of the present invention to provide a code selector for a writing machine which permits the code to be readily changed without requiring disassembly of the selector or the replacement of code slides.

A further object of the present invention is to provide a novel code selector mechanism particularly adapted for use in a typewriter, and one wherein detachable couplings between code selective slides and associated code-element bails permit the selection of bails for actuation by a particular one of the slides to be changed without requiring replacement of that slide.

The invention will be more completely understood by reference to the following detailed description which is to be read in conjunction with the appended drawings, in which:

FIG. 1 is a vertical sectional view through a typical typewriting mechanism partially showing a code selector incorporating the present invention;

FIG. 4 is an end view of the code selector shown in FIG. 2, omitting certain parts for the sake of clarity;

Figure 2:
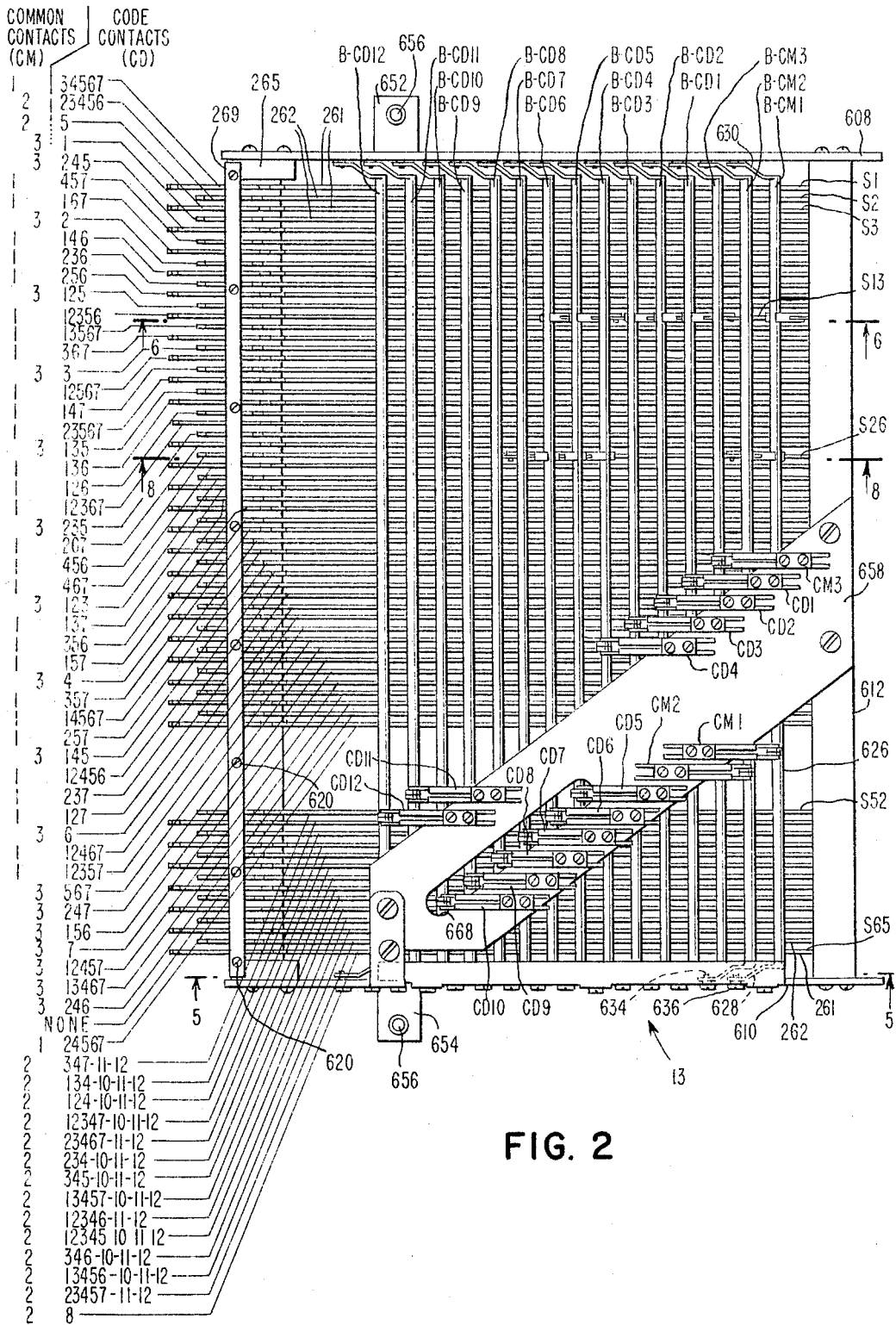
FIG. 2 is a top view of the code selector shown partically in FIG. 1, omitting certain parts for the sake of clarity.
Figure 9:
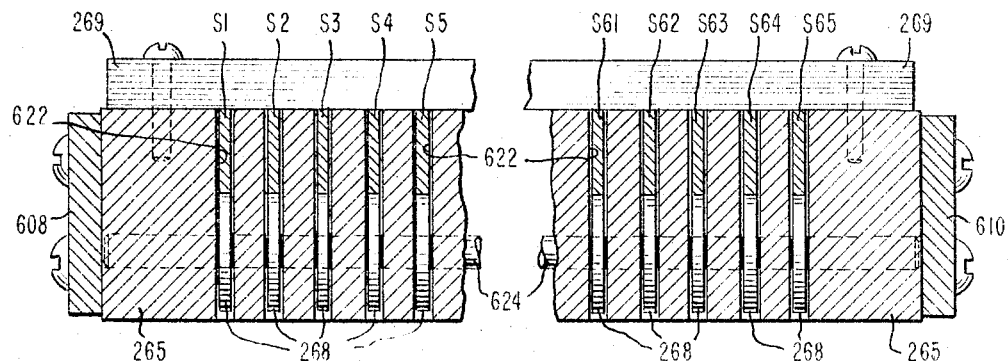
Figure 10:
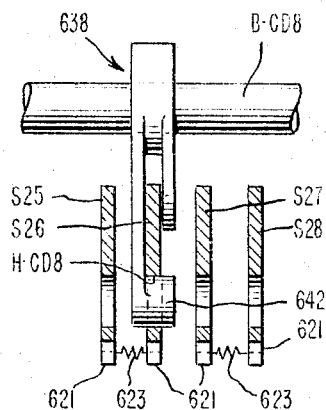
Figure 11:
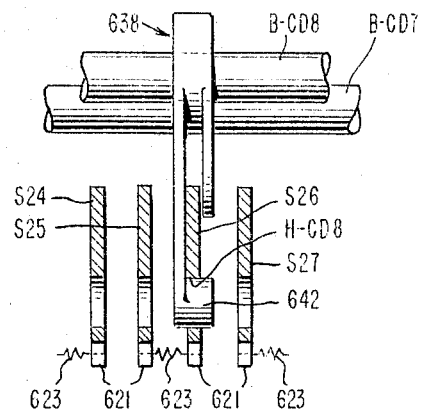
Figure 12:
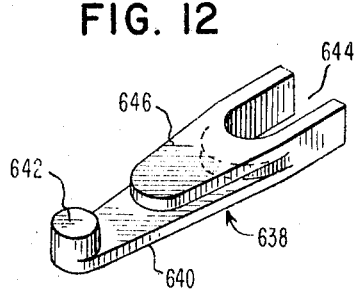
Figure 13:
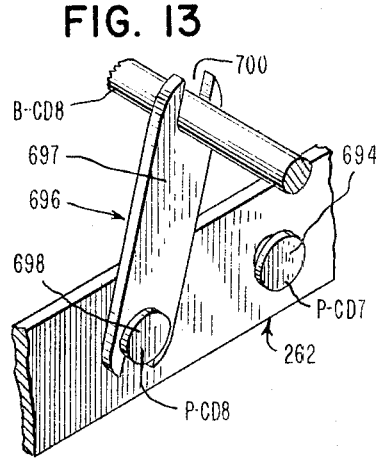

FIGS. 5, 6 and 8 are sectional views of the code selector shown in FIG. 2, taken generally along the section lines 5—5, 6—6 and 8—8 of that figure and illustrating some of the details of the code selector, while omitting certain parts for the sake of clarity;

FIG. 7 is a view similar to FIG. 6 showing one of the slides of the code selector after movement corresponding, for example, to actuation of the typewriter key associated with the slide;

FIG. 9 is a fragmentary sectional view of the code selector, taken generally along the section line 9—9 in FIG. 5 and looking in the direction of the arrows of that figure, omitting certain parts for the sake of clarity;

FIG. 10 is a fragmentary sectional view of the code selector taken generally along the line 10—10 in FIG. 8 and looking in the direction of the arrows of that figure, illustrating the link coupling one of the slides to one of the bails of the code selector and omitting certain parts for the sake of clarity;

FIG. 11 is a view similar to FIG. 10 showing the movement of the bail following movement of the slide;

FIG. 12 is a perspective view of a typical link member configuration suitable for use in a code selector in accordance with the present invention; and FIG. 13 is a perspective view of a modified link member in accordance with the invention coupling together a bail and slide.

Referring now more particularly to FIG. 1, there is shown a typical typewriter incorporating a code selector which embodies the present invention. The general typewriter mechanism shown is substantially the same as that shown in FIG. 3 of the Blodgett patent referred to above, and in order to facilitate the description, the same reference numerals used in FIG. 3 of the Blodgett patent are employed herein to designate like parts. Reference should be made to the Blodgett patent for a complete description of the general typewriter mechanism. The code selector mechanism 13, described more fully hereinafter, differs from that of the Blodgett patent.

In FIG. 1, each of the typewriter keys 40 is coupled to an associated one of key levers 27 pivoted on a rod 30 which is supported by a cross member (not shown) of power frame assembly 12. A power roller 21 is mounted under the power frame assembly for rotation in the direction of the arrow by a suitable drive motor (not shown). Cooperating with the power roller 21 are cam units 31 which are pivotally mounted on rods 32 extending parallel to the power roller 21 and on both sides of the power roller. There is a cam unit 31 associated with each key lever 27, and each cam unit in control of a type bar 36 is connected by a link 33 and by socket 44, turnbuckle 43 and link 42 with a bell crank 34 also pivoted on rod 30. The cam units 31 are positioned along the length of the power roller 21, successive ones of the cam units being positioned on opposite sides of the power roller, as shown in the figure. Each bell crank 34 associated with a cam unit 31 is connected by a link 35 to the associated type bar 36 through the medium of a toggle 37, which consists of arms 45 and 46 joined by pin 48 and pivoted about pins 47 and 49, respectively. A spring 50 stabilizes the operation of the toggle assembly, the linkage of which may be adjusted by springing apart or closing a pair of ears 51 on arm 45. The type bar 36 is pivoted on the usual wire segment 38 provided on a type bar segment 39 located in front of the conventional platen (not shown.)

A key lever locking bail 29 is provided, operated by a normally energized magnetic lock (not shown) to prevent effective operation of the keys when the power for any reason is off, or when the keys should not be operated for any other reason.

When any character or function key 40 is depressed, the key lever 27 causes the associated cam unit 31 to operably engage the power roller 21 in a well known way, thereby rocking the cam unit clockwise or counterclockwise, according to whether the operative cam unit is positioned respectively to the left or to the right of the power roller 21 as shown in FIG. 1. The rocking of the cam unit causes its link 33 to be drawn downwardly, thereby rocking the corresponding bell crank 34. This movement of the bell crank 34, through the corresponding link 35 and toggle 37, causes type bar 36 associated with the selected key to rock in a printing stroke and to make an impression of the type upon a worksheet (not shown) carried about the platen. The type bar, near the end of its operative stroke, engages the usual universal bar 41 and causes the same to rock.

In FIG. 1, a code translator 14 is shown which corresponds to the code translator 14 shown and described in the Blodgett patent. The code translator serves to actuate the key levers 27, and thus the corresponding type bars 36, when the typewriter acts as a reproducing mechanism to reproduce coded information. More particularly, the code translator is power-driven from the typewriter motor and includes a plurality of hooked-end seekers 490 individual to the key levers 27 and adapted upon power-driven downward motion of a seeker to pull down an associated key lever by engagement of its hooked end with a pin 491 secured on the side of the associated key lever. The translator includes an electromagnet individual to each code element of the code signals supplied to the tranlsator, and these electromagnets in their energized and de-energized states position code translator slides which by their composite positions select the particular seeker to be operated by the prevailing code signal supplied to the translator. Thus the code signals in effecting selective operation of successive key levers cause the typewriter cam unit 31 to engage the power roller 21 to print the coded information conveyed by the coded signals supplied to the code translator 14.

The present invention is embodied in the code selector 13 which serves to provide a coded signal in response to the actuation of a particular one of the character or function keys 40. As explained above, each time one of the typewriter keys 40 is depressed, a related one of the cam units 31 is tripped and caused to engage the constantly rotating power roller 21. As a result, the cam unit is rocked first away from the power roller 21 and then back toward the power roller and re-latched in the position shown. For example, the cam units 31 to the left of the roller 21 in FIG. 1, referred to herein as front cam units, are pivoted clockwise when the cam engages the roller, while the cam units 31 to the right of the power roller, referred to herein as rear cam units, are pivoted counterclockwise. Each cam unit 31 has a downward extension 263 that carries a pivoted roller 264. Each time such a cam unit is tripped and is operated, its roller 264 effects a sliding movement of a corresponding one of selector slides 261 and 262. In particular, the rollers 264 of the front cam units 31 engage upstanding lugs 264a at the forward ends of the slides 261, whereby the slides 261 are moved initially to the left in FIG. 1 and then back to the right upon the re-latching of the cam units. The rollers 264 of the rear cam units 31 engage upstanding lugs 264a of the slides 262, whereby the slides 262 are moved initially to the right and then back to the left upon the re-latching of the cam units. It will be noted, then, that depression of one of the typewriter keys 40 results in a reciprocating movement of an associated one of the slides 261 or 262.

Figure 3:
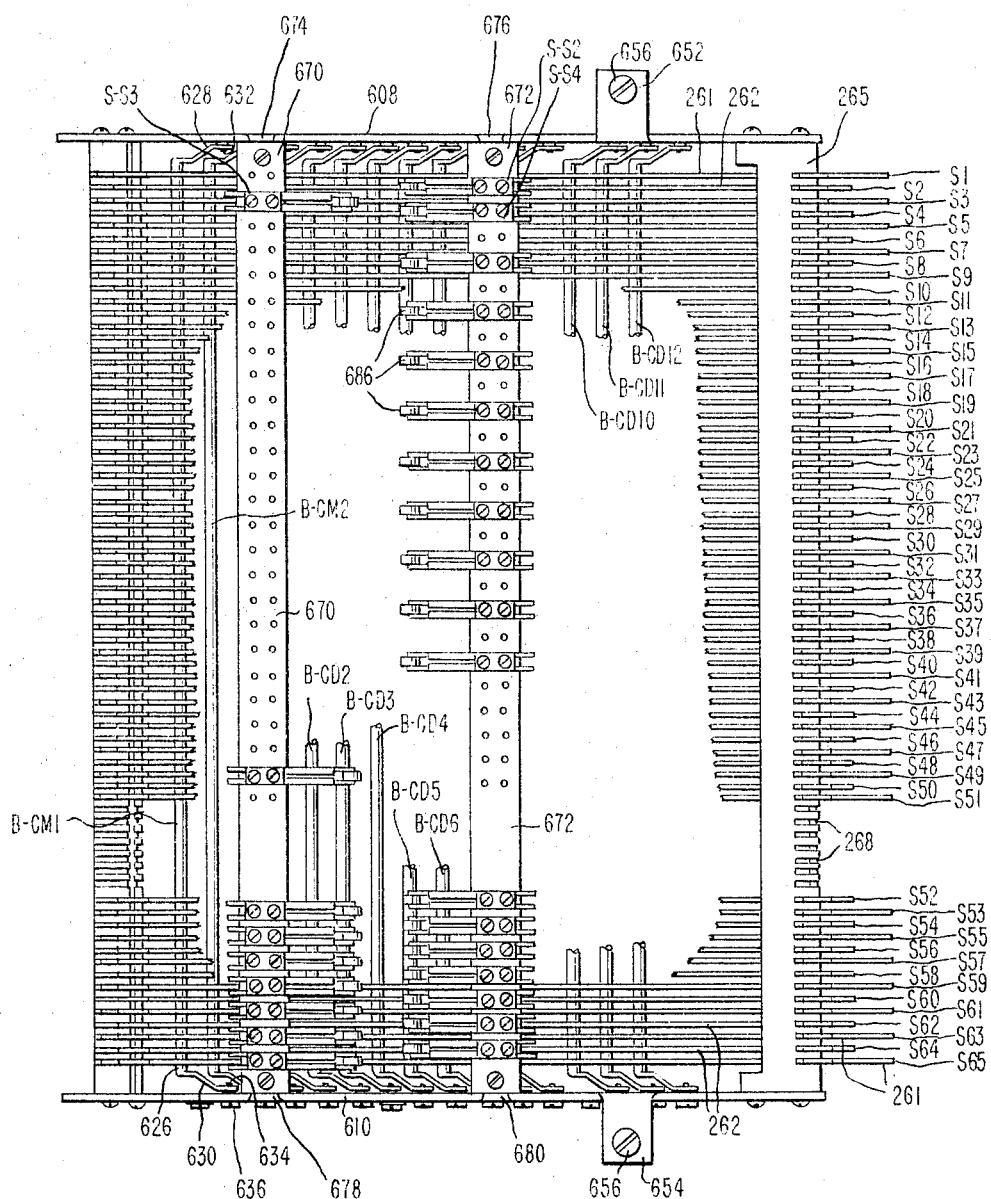
FIG. 3 is a bottom view of the code selector shown in FIG. 2, omitting certain parts for the sake of clarity.

Referring now to FIGS. 2 and 3, all the slides used in a code selector for a typical typewriter are shown. The slides have been designated S1, S2, S3 . . . S65. The number of slides chosen in this particular embodiment of the invention, namely sixty-five, is purely arbitrary; the actual number depends upon the number of keys in the typewriter. The odd-numbered slides S1, S3, S5 . . . S65 correspond to the slides 261 having upstanding lugs 264a shown as positioned in FIG. 1 to the left of the power roller 21. The even-numbered slides S2, S4, S6 . . . S64 are the slides 262 having upstanding lugs 264a positioned to the right of the power roller. All the slides S1, S2, S3 . . . S65 are supported by a frame formed from side frame members 608 and 610 joined to front guide comb 265 and rear guide comb 612. The slides are mounted for sliding movement within the guide combs 265 and 612 as shown more clearly in FIGS. 6–9. FIGS. 6 and 7 show a representative one of the slides (S13) positioned within the guide combs. The slide S13 is one of the slides 261 in FIG. 1 whose upstanding lug 264a is positioned to the left of the power roller 21. Each of the slides 261 is formed with a substantially flat surface 614 which rides against an antifriction roller 268 contained within the front guide comb 265. The rear portion of each of the slides 261 is similarly formed with a flat edge 616 which rides upon an antifriction roller 618 mounted in the rear guide comb 612. Reciprocating movement of each of the slides 261 is limited by upstanding lugs 270 and 271 which engage a stop bar 269. The stop bar is fastened to the front guide comb 265 by screws 620 shown also in FIG. 2. FIG. 6 shows the slide S13 in an unactuated position wherein the lug 270 is positioned against the stop bar 269. FIG. 7 shows the same slide moved to the left upon actuation by the roller 264 of the associated cam unit 31, as explained above with reference to FIG. 1. In this position of the slide, the lug 271 engages the stop bar 269, which limits the movement of the slide. FIG. 7 thus shows the actuated position of the slide following the depression of the associated character or function key 40 in FIG. 1.

FIG. 8 shows a representative slide S26 which is one of the slides 262 whose upstanding lug 264a is positioned to the right of the power roller 21 in FIG. 1. The slide has a substantially flat surface 614 at the front portion thereof which rides upon an antifriction roller 268 in the front guide comb 265. Similarly, the rear portion of the slide contains a flat surface 616 which rides upon an antifriction roller 618 in the rear guide comb 612. The slide also includes upstanding lugs 271 and 270, corresponding to the same numbered lugs in each of the slides 261. In this case, however, the lug 270 is positioned to the right of the stop bar 269 shown in FIG. 8, whereas the lug 270 of the slide 261 shown in FIG. 6 is positioned to the left of the stop bar. In FIG. 8, the slide S26 is moved to the right upon actuation by the roller 264 of the associated cam unit 31, as explained above with reference to FIG. 1. The lug 271 then engages the stop bar 269, which limits further movement of the slide to the right.

Each of the slides 261 and 262 includes a downwardly extending lug 621 thereon, as shown in FIGS. 6–8. A spring 623 connects together the lug of each slide 261 to the corresponding lug of one of the adjacent slides 262. FIGS. 10 and 11 illustrate the manner in which the springs 623 couple together adjacent ones of the slides. FIG. 10 shows four typical slides S25, S26, S27 and S28. A spring 623 connects together the lugs 621 of the adjacent slides S25 and S26, while a similar spring 623 couples together the lugs 621 of adjacent slides S27 and S28. As illustrated in FIGS. 6–8, the lugs 621 of all the slides 261 are positioned toward the left-hand ends of the slides, whereas the lugs of all the slides 262 are positioned toward the right-hand ends of the slides. Thus it will be seen that each spring 623 coupling together a slide 261 with an adjacent slide 262 exerts a force tending to draw the slide 261 to the right and hence to bias the slide in the position shown in FIG. 6, while the slide 262 is drawn to the left to be biased in the position shown in FIG. 8. Hence each spring 623 serves to bias the associated slides 261 and 262 to the unactuated positions wherein the upstanding lugs 270 engage the stop bar 269. Each of the slides may be actuated to the left (slide 261) or to the right (slide 262) by its corresponding cam unit 31, as explained above, against the biasing of the spring. The spring biasing returns the actuated slide to the unactuated position following latching of the associated cam unit.

FIG. 9 shows the antifriction rollers 268 and all the slides S1, S2, S3 . . . S65 positioned within the front guide comb 265. The front guide comb is slotted as at 622 to accommodate the slides and the rollers, and also includes an axle 624 upon which the rollers 268 are mounted. The rear guide comb 612 carries the rear portions of the slides and the rear antifriction rollers 618 in the same fashion.

Referring again to FIGS. 2 and 3, each of the slides S1, S2, S3 . . . S65 is adapted to selectively actuate any one or more of fifteen bails designated B–CM1, B–CM2, B–CM3, B–CD1, B–CD2 . . . B–CD12 positioned transversely with respect to the slides. The bails are all formed in the same fashion, and hence the bail B–CM1 will be described as representative. The bail is formed from a rod 626 extending across the slides, and is terminated at one end by an arm 628 and at its other end by a similar arm 630. Typically, the arms are an integral part of the bail, but they can be made as separate members secured to the rod 626, if desired. The arm 628 is pivotally mounted upon a pin 632 contained in the frame member 608; the arm 630 is pivotally mounted about a pin 634 formed on the end portion of a screw 636 threaded into frame side piece 610. The arms 628 and 630 are formed the same; FIG. 5 shows the arms 630 in side elevation.

Each of the bails B–CM1 . . . B–CD12 is thus mounted for pivotal movement toward and away from the slides S1, S2 . . . S65. Each of the slides selectively actuates one or more of the bails according to a particular code. For example, the slide S13 may be adapted to actuate bails B–CM1, B–CD1, B–CD2, B–CD3, B–CD5 and B–CD6. To this end, novel links such as link 638 shown in FIG. 12 are employed. Referring to FIG. 12, the link 638 is conveniently formed from a resilient plastic material such as nylon and includes a flat elongated body portion 640 having a pin 642 integrally formed at one end thereof and extending generally at right angles to the plane of the body portion. The other end of the link is of a thickness grater than the thickness of the main body portion 640 and is slotted as at 644. A tongue or flange 646 extends from the slot 644 toward the pin 642 substantially parallel to the main body portion 640 and spaced from the latter by at least the thickness of one of the slides 261 or 262. The body portion 640 of the link is resilient to permit sidewise deflection while the pin 642 is inserted in or withdrawn from an aperture of a slide at the time the link is assembled upon or disassembled from an associated slide.

FIGS. 6–8 show the manner in which the links 638 couple together a slide with different ones of the bails. In FIG. 6, which illustrates the slide S13, only one of the links 638 is shown for convenience. It is shown coupled to the bail B–CD1. It will be noted that the slide is formed with fifteen holes H–CM1, H–CM2, H–CM3, H–CD1, H–CD2 . . . H–CD12, each corresponding to an associated one of the bails. The link 638 is positioned so that the pin 642 is positioned in the hole H–CD1. The main body portion 640 of the link is positioned on one side of the slide S13 while the flange 646 is positioned on the other side of the slide. Thus the flange 646 and the main body portion 640 embrace the slide and prevent the pin 642 from dropping out of the hole H–CD1. At the same time, the slot 644 in the link 638 is positioned so that it engages the bail B–CD1.

In the position of the slide S13 shown in FIG. 6, which is the unactuated position of the slide, the link 638 assumes the position shown in the figure and the bail B–CD1 is positioned at the same level as all the other bails. If the slide S13 is actuated so that it is moved to the left, as shown in FIG. 7, which occurs when the typewriter key corresponding to this particular slide is actuated, the link 638 assumes the position shown in FIG. 7. The link pivots with the pin 642 rotating within the hole H–CD1. The flange 646 and the main body portion 640 of the link in no way impede the pivotal movement of the link. At the same time, the link pivots about the bail B–CD1, and, in assuming the position shown in FIG. 7, raises that bail above the level of the other bails.

FIG. 8 shows one of the links 638 positioned in one of the slides 262, in particular in the slide S26. Only one link has been shown in this slide for the purpose of illustration. It will be noted that the slide contains holes H–CM1 . . . H–CD12 the same as the slides 261. In this case, however, the slide 262 is adapted to be actuated from left to right, and hence the link 638 assumes the position shown in FIG. 8 for the unactuated position of the slide S26. Movement of the slide to the right causes the link to pivot and to raise the associated bail upwardly, in this case bail B–CD8 associated with the hole H–CD8 in which the pin 642 of the link is inserted. FIGS 10 and 11 show the action of the link 638 in raising the bail B–CD8.

Each of the slides 261 and 262 is provided with one or more links 638 in the manner shown in FIGS. 6–8 so that particular ones of the bails B–CM1 . . . B–CD12 are actuated when the slides are actuated. The number of links employed for each slide and the placement of these links within the slide is dependent upon the particular code employed. It will be appreciated that if the code is changed, neither the slides nor the links must be discarded for new ones; all that is required is that the links be changed so that they assume their new and proper positions for the new code employed. Specifically, any link may have its position changed by snapping the pin 642 of the link out of the corresponding one of the holes H–CM1 . . . H–CD12, sliding the link so that the corresponding bail is removed from the slot 644, and repositioning the link on the slide or removing it from the slide altogether. Hence any code is changed merely by changing the locations of and/or adding and/or subtracting one or more links with respect to each slide.

It should be noted that the links 638 may not all be made alike. In particular, the links may be made so that the distance between the center of the pin 642 and the bottom of the slot 644 is different for different links. If two of such different links are placed on a given one of the slides 261 and 262, for example, it is apparent that the bail associated with the link having the longer pin-slot distance will be actuated before the bail associated with the other link. In this fashion, links of varying pin-slot distances may be employed to effect sequential actuation of different bails upon movement of any one or more of the slides 261 and 262.

To facilitate the changing of a code, the entire code selector 13 shown in FIG. 2 is adapted to be pivotally mounted so that it may be swung downwardly out of the machine in which it is incorporated. Referring to FIG. 4, the side frame piece 610 includes a downwardly extending portion 648 at the right-hand side thereof. The opposite frame piece 608 is formed with a similar extension, and a shaft 650 connects the two extensions. The extensions are adapted to pivot freely about the shaft 650, which is adapted to be carried by the side frames (not shown) of the typewriter. The side frame pieces 608 and 610 of the code selector include at their opposite ends outwardly extending lugs 652 and 654, respectively, which are apertured to receive screws 656. The screws 656 join the lugs 652 and 654 to portions of the main typewriter frame (not shown) to secure the entire code selector assembly 13 in place. When it is desired to operate on the code selector to change the code, the screws 656 are removed and the entire selector is pivoted about the shaft 650 to swing it downwardly out of the typewriter so that the links 638 may be easily changed in accordance with the new code.

The bails B–CM1 . . . B–CD12 actuate corresponding switches CM1 . . . CD12 shown in FIG. 2 mounted upon a bridge or bracket 658 positioned over the bails. The switches CM1 . . . CD12 are each associated with a different bail and their contacts are typically utilized to control the electrical continuity of code signal circuits which may control a tape punch, for example, to produce a by-product punched tape. The contacts of switches CM1, CM2 and CM3 are designated as common contacts and serve, for example, to supply electrical energization to contacts of groups of the switches CD1 . . . CD12. The contacts of switches CD1 . . . CD12 are designated as code contacts, various combinations of which, when actuated along with a particular common contact, designate the different typewriter key levers. FIG. 2 tabulates for each of the slides just which of the common contacts CM1 . . . CM3 and which of the code contacts CD1 . . . CD12 are actuated by virtue of the actuation of the corresponding bails by the slides in conformity with a particular typical code system which is merely representative of one of many codes. For example, the slide S2 (corresponding perhaps to the key lever for the character B), when actuated causes common contact CM2 and code contacts CD2 . . . CD6 to be actuated through the associated bails B–CM2 and B–CD2 . . . B–CD6.

FIGS. 4 and 5 show the manner in which the switches CM1 . . . CD12 are actuated by the associated bails. In FIGS. 4 and 5, only switches CM1 and CD11 are shown as representative. The switch CM1 is formed with normally open switch contacts 660. The lower segments 662 of these contacts are coupled to a vertically extending link 664 of insulating material which, as shown in FIG. 5, is coupled by a further link 665 of insulating material to bail B–CM1. The lower end of the lower link 665 is slotted as at 666 to engage the bail. Hence when the bail is pivoted upwardly, by virtue of the actuation of one of the slides S1 . . . S65, the links 664 and 665 are raised upwardly to close the normally open switch contacts 660 and to complete the electrical continuity of electrical circuits (not shown). The switch CD11 in FIG. 4 is coupled to the bail B–CD11 shown in FIG. 5 by similar links 664 and 665, and is actuated when the bail is raised.

Referring again to FIG. 2, it will be noted that the switches CD5 . . . CD10 are positioned on the plate 658 so that the links associated therewith are coupled to the corresponding bails through a slotted portion 668 of the plate. The positioning of the switches on the plate and the addition of the slot are arbitrary, of course.

Each of the slides S1 . . . S65 is adapted to actuate a corresponding one of switches S–S1 . . . S–S65 (FIG. 3) when the slide is actuated. Referring to FIG. 3, two relatively narrow plates 670 and 672 extending transversely with respect to the slides are connected respectively to brackets 674 and 676 forming portions of the frame side piece 608 and respectively to brackets 678 and 680 forming portions of side frame piece 610. The plate 670 has mounted thereon all the switches S–S1, S–S3 . . . S–S65 associated with the odd-numbered slides S1, S3 . . . S65, while the plate 672 has mounted thereon all the switches S–S2, S–S4 . . . S–S64 associated with the even-numbered slides S2, S4 . . . S64. For example, in the top portion of FIG. 3, switch S–S3, actuated by slide S3, is shown mounted on the plate 670; switches S–S2 and S–S4 are shown mounted adjacent each other on the plate 672 to be actuated respectively by the slides S2 and S4.

FIGS. 4 and 5 show the manner in which the switches S–S1 . . . S–S65 are actuated by the associated slides. In FIG. 4, only switches S–S64 and S–S65 are shown, inasmuch as all the other switches are obscured by these switches. The switch S–S65 is formed with normally open switch contacts 682. The upper segments 684 of these contacts are coupled by a vertically extending link 686 of insulating material which is pivotally coupled to another link 688 also of insulating material. The link 688 is slotted at its upper end (FIG. 5) as at 690 so that it may pivot about a pin 692 fixed to the side of the slide S65. As the slide S65 is actuated to the left in FIG. 5, the link 688 pivots about the pin 692 forcing the link 686 downwardly to close the normally open switch contacts 682 and to complete electrical circuits (not shown). The switch S–S64 shown in FIG. 4 is coupled to the slide S64 by similar links 686 and 688, and is actuated in similar fashion when the slide is actuated, in this case from left to right.

It should be noted that the switches S–S1 . . . S–S65 are optional, in that normally only a few special ones (as for numeral and function keys) are provided. In FIG. 3, provision has been made for accommodating a switch for each slide, if that is desired.

FIG. 13 is a perspective view of a modified link member in accordance with the invention shown coupling a representative slide 262 to an associated bail, for example, bail B–CD8. In this case, the slide is not formed with holes H but instead includes pins P thereon, two of which P–CD8 and P–CD7 are shown as representative. Each pin is associated with a corresponding one of the bails B and extends substantially perpendicular to the plane of the slide. The pin includes a head 694. The modified link member, designated 696, is formed with an elongated body portion 697 containing slots 698 and 700 at the ends thereof. The slot 698 engages one of the pins P in the slide; as shown in FIG. 13 the pin P–CD8 is engaged by the slot 698. The head 694 of the pin retains the link member in place by engaging the body portion 697, thereby preventing the link member from sliding off the pin. The slot 700 at the other end of the link member engages the corresponding bail associated with the pin; in FIG. 13 the bail B–CD8 is engaged by the slot 700. In use the link member 696 may be easily positioned on any one of the pins P by engaging the associated one of the bails B with the slot 700, raising the bail sufficiently to permit the slot 698 to engage the corresponding pin on the slide, and lowering the bail so that the link member is positioned as shown in FIG. 13. Then, as the slide is thereafter moved in the direction of its elongation, the link member pivots about the pin, e.g., the pin P–CD8 in FIG. 13, and moves the associated bail.

From the description of the invention above, it will be understood that a unique code selector arrangement for a writing machine has been provided, wherein the code may be easily and quickly changed without requiring the disassembly of the selector or the providing of completely new selector slides. The invention permits relatively simple coding changes on the relatively infrequent occasions when changes may be required. Such coding changes will normally involve only a few special keys such as the numeral and/or function keys. The need for the changes may be brought about by system changes wherein it is desired to use the output of the code selector to feed input signals to a different machine which is designed to accept a different code. Or, as described above, it may be expedient to alter the sequence of operation of certain bail operated contacts. All of these changes may be accomplished by means of the links, the sizes of which may not be all alike, and their ready attachment between any slide and bail.

Modifications of the apparatus disclosed will readily suggest themselves to persons skilled in the art to which this invention pertains. Accordingly, the invention should be taken as defined by the following claims.

What is claimed is:

1. Coding apparatus, comprising a slide arranged for back and forth motion, a plurality of code selective bails positioned transversely with respect to the slide each in preselected relation to an individual location on said slide, each of said bails being mounted for movement toward and away from said slide, and a link having means pivotally and disconnectably coupling said link to said slide at any one of said locations on said slide and having means pivotally and disconnectably coupling said link to the associated bail having said predetermined relation to the location on said slide to which the link is pivotally coupled to effect movement of said associated bail upon movement of said slide in the direction of its elongation.

2. Coding apparatus, comprising a plurality of slides, a plurality of code selective bails, frame means for mounting said slides for individual back and forth motion and for mounting said bails across said slides for movement each toward and away from said slides, each of said bails being thus positioned in preselected relation to an individual location on each of said slides, and a plurality of links each having means pivotally and detachably coupling said each link to any one of said individual locations on said slides and having means pivotally and detachably coupling said each link to the bail having said predetermined relation to the location on the slide to which said each link is pivotally coupled to effect through the coupling of said links movement of selected bails upon movement of each of said slides.

3. Coding apparatus, comprising a plurality of slides, a plurality of code selective bails, first frame means for mounting said slides for individual back and forth motion and for mounting said bails across said slides for movement each toward and away from said slides, each of said bails being thus positioned in preselected relation to an individual location on each of said slides, a plurality of links each having means pivotally and detachably coupling said each link to any one of said individual locations on said slides and having means pivotally and detachably coupling said each link to the bail having said predetermined relation to the location on the slide to which said each link is pivotally coupled to effect through the coupling of said links movement of selected bails upon movement of each of said slides, second frame means, and means for pivotally coupling said first frame means to said second frame means, so as to permit said first frame means to be positioned in a working position in said second frame means and in a second position to which said first frame means may be pivoted from said working position to facilitate the changing of the positioning of said detachable links on said slides in accordance with a change in a code.

4. Coding apparatus, comprising a plurality of elongated slides, a plurality of bails, first frame means for mounting said elongated slides all substantially parallel to each other for movement each in the direction of its elongation and for mounting said bails transversely with respect to said slides all substantially parallel to each other for movement each toward and away from said slides, each of said bails being thus positioned in preselected relation to an individual location on each of said slides, a plurality of links each having means pivotally and detachably coupling said each link to any one of said individual locations on said slides and having means pivotally and detachably coupling said each link to the bail having said predetermined relation to the location on the slide to which said each link is pivotally coupled to effect through the coupling of said links movement of selected bails upon movement of each of said slides, second frame means, means for pivotally coupling said first frame means to said second frame means, so as to permit said first frame means to be positioned in a working position in said second frame means and in a second position to which said first frame means may be pivoted from said working position to facilitate the changing of the positioning of said detachable links on said slides in accordance with a change in a code, and a plurality of switches each of which is actuated by an individual one of said bails.

5. Coding apparatus, comprising a movable first member, a plurality of movable second members, said first member including a plurality of holes each one of which is located in preselected relation to an individual one of said second members, a detachable link having a pin positioned in any one of the holes of said first member, a slot in said link engaging the second member having said preselected relation to the hole in which said pin is positioned, so as to effect movement of said second member having said preselected relation to the hole in which said pin is positioned upon movement of said first member, and means responsive to movement of said movable second members for generating coded signals.

6. Coding apparatus, comprising an elongated slide movable in the direction of its elongation, a plurality of code selective bails positioned transversely with respect to said slide, each of said bails being mounted for movement toward and away from said slide, said slide including a plurality of holes each one of which is located in preselected relation to an individual one of said bails, and a detachable link including an elongated body portion having a pin at one end thereof and a slot at the other end thereof and a flange extending from said slot toward said pin and spaced from said body portion, said pin being positioned in any one of the holes of said slide, the slot in said link engaging the bail having said preselected relation to the hole in which said pin is positioned, said flange and said body portion straddling said slide to retain the link in position, so as to effect movement of the bail engaged by said slot as said slide is moved in the direction of its elongation.

7. Coding apparatus, comprising an elongated slide movable in the direction of its elongation, a plurality of bails positioned transversely with respect to said slide, each of said bails being mounted for movement toward and away from said slide, said slide including a plurality of holes each one of which is located in preselected relation to an individual one of said bails, a detachable link including a substantially flat and elongated body portion having a pin at one end thereof extending generally at right angles away from the plane of the body portion and an elongated slot in the opposite end thereof, said slotted end of said body portion being made of greater thickness than the remaining part of said body portion and including a flange which extends generally parallel to said remaining part of said body portion away from said slotted end toward said pin, said pin being positioned in any one of the holes of said slide, said elongated slot engaging the bail having said preselected relation to the hole in which said pin is positioned, said flange and said remaining part of said body portion straddling said slide to retain the link in position, so as to effect movement of the bail engaged by said slot as said slide is moved in the direction of its elongation, and means responsive to movement of said bails for generating coded signals.

8. Coding apparatus, comprising a movable first member, a plurality of movable second members, said first member including a plurality of pins each one of which is located in preselected relation to an individual one of said second members, a detachable link having a first slot therein engaging any one of the pins of said first member, a second slot in said link engaging the second member having said preselected relation to the pin engaged by said first slot, so as to effect movement of the second member engaged by said second slot upon movement of said first member, and means responsive to movement of said movable second members for generating coded signals.

9. Coding apparatus, comprising an elongated slide movable in the direction of its elongation, a plurality of code selective bails positioned transversely with respect to said slide, each of said bails being mounted for movement toward and away from said slide, said slide including a plurality of pins each one of which is located in preselected relation to an individual one of said bails, each of said pins extending away from said slide and including an enlarged head portion at the end thereof away from said slide, and a detachable link having a first slot therein engaging any one of the pins of said slide and retained on said pin by said enlarged head portion, and a second slot in said link engaging the bail having said preselected relation to the pin engaged by said first slot, so as to effect movement of the bail engaged by said second slot upon movement of said slide in the direction of its elongation.

10. Coding apparatus, comprising a plurality of elongated slides each movable in the direction of its elongation and all positioned substantially parallel to each other, a plurality of bails positioned transversely with respect to said slides, each of said bails being mounted for movement toward and away from said slides, each of said slides including a plurality of holes each of which is located in a predetermined relation to an individual one of said bails, a plurality of links each having a pin therein positioned in any one of the holes of said slides, a slot in each of said links engaging the bail having said predetermined relation to the hole in which said pin of said each link is positioned, so as to effect through the coupling of said links movement of selected bails upon movement of each of said slides, and means responsive to movement of said bails for generating coded signals.

11. Coding apparatus, comprising a plurality of elongated slides each movable in the direction of its elongation and all positioned substantially parallel to each other, a plurality of bails positioned transversely with respect to said slides, each of said bails being mounted for movement toward and away from said slides, each of said slides including a plurality of pins each one of which is located in preselected relation to an individual one of said bails, a plurality of links each formed from an elongated body portion having first and second slots at the ends thereof, the first slot of each link engaging any one of the pins of said slides, the second slot of said each link engaging the bail having said preselected relation to the pin engaged by the first slot of said each link, so as to effect through the coupling of said links movement of selected bails upon movement of each of said slides, and means responsive to movement of said bails for generating coded signals.

12. Coding apparatus, comprising a plurality of elongated slides, a plurality of code selective bails, first frame means for mounting said elongated slides all substantially parallel to each other for movement each in the direction of its elongation and for mounting said bails transversely with respect to said slides all substantially parallel to each other for movement each toward and away from said slides, each of said bails being thus positioned in preselected relation to an individual location on each of said slides, a plurality of links each having means pivotally and detachably coupling said each link to any one of said individual locations on said slides and having means pivotally and detachably coupling said each link to the bail having said predetermined relation to the location on the slide to which said each link is pivotally coupled to effect through the coupling of said links movement of selected bails upon movement of each of said slides, second frame means, means for pivotally coupling said first frame means to said second frame means, so as to permit said first frame means to be positioned in a working position in said second frame means and in a second position to which said first frame means may be pivoted from said working position to facilitate the changing of the positioning of said detachable links on said slides in accordance with a change in a code, a plurality of first switches each of which is actuated by an individual one of said bails for generating a coded signal, and a plurality of second switches each of which is actuated by an individual one of said slides.

References Cited by the Examiner

UNITED STATES PATENTS

| 811,695 | 2/1906 | Casserly | 292—36 |
| 1,126,639 | 1/1915 | Jones | 292—35 |
| 1,513,835 | 11/1924 | Lovell | 292—35 |
| 1,808,403 | 6/1931 | Eklund | 292—48 |
| 2,082,155 | 6/1937 | Errera | 235—146 |
| 2,540,029 | 1/1951 | Hamilton et al. | 197—20 |
| 2,700,446 | 1/1955 | Blodgett | 197—20 |

FOREIGN PATENTS 3,001  12/1892  Great Britain.

ROBERT E. PULFREY, *Primary Examiner.*

EDGAR S. BURR, *Assistant Examiner.*